United States Patent Office 3,533,881
Patented Oct. 13, 1970

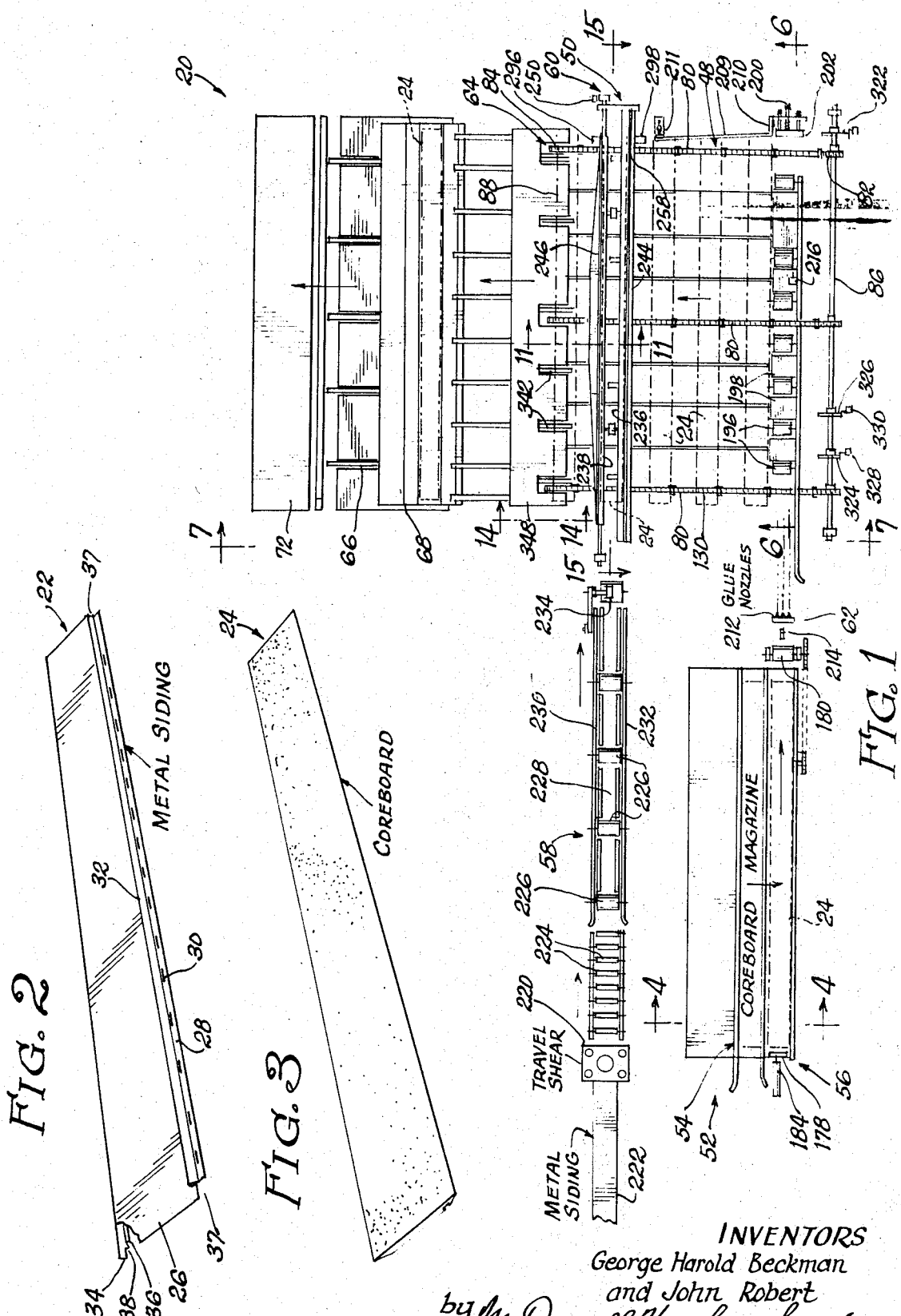

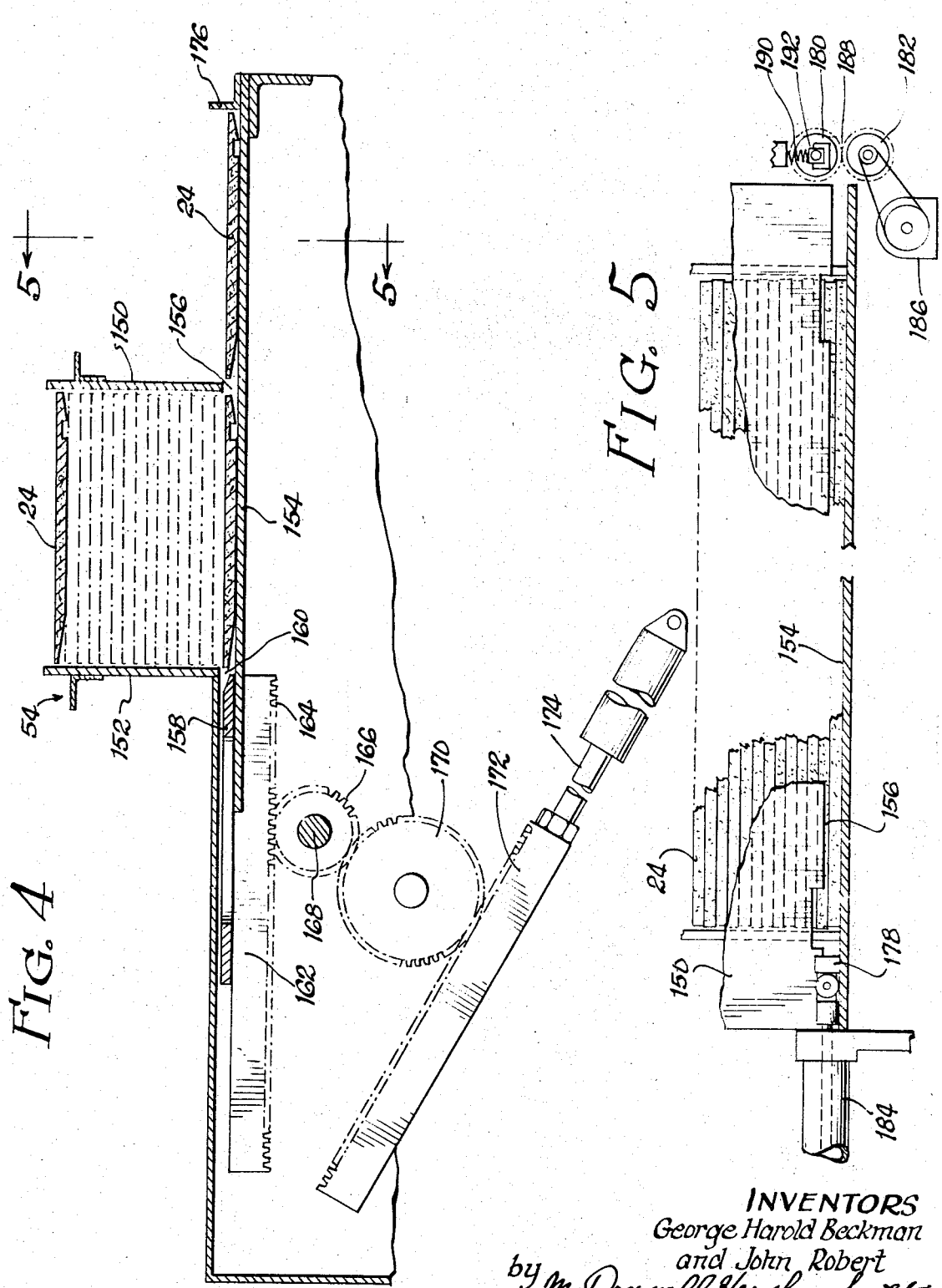

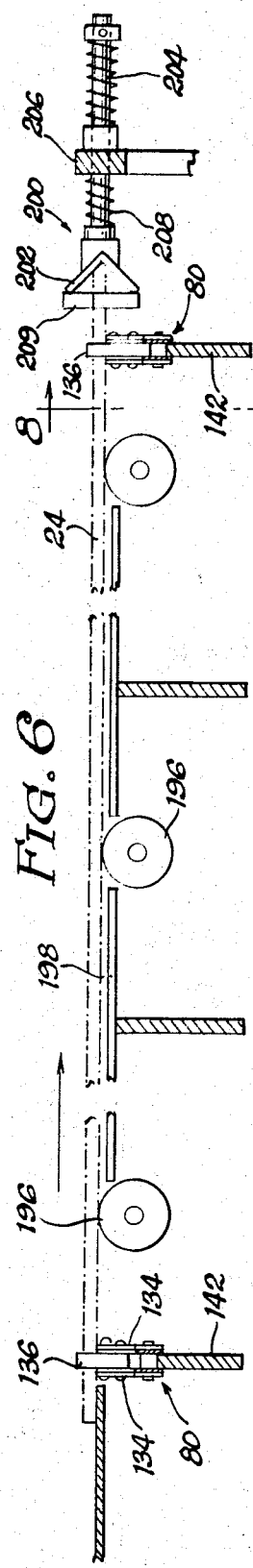
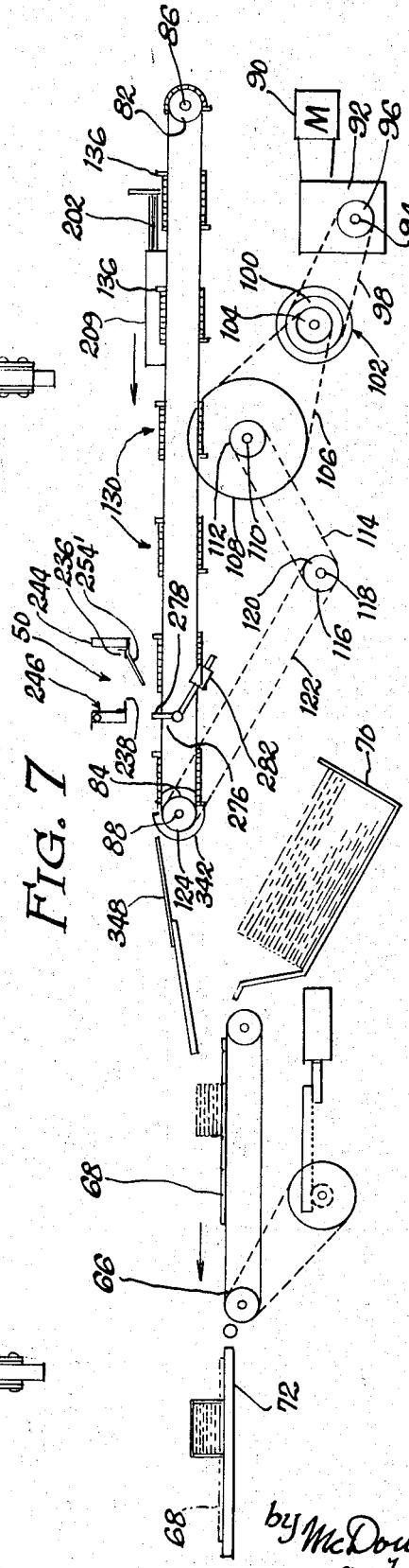
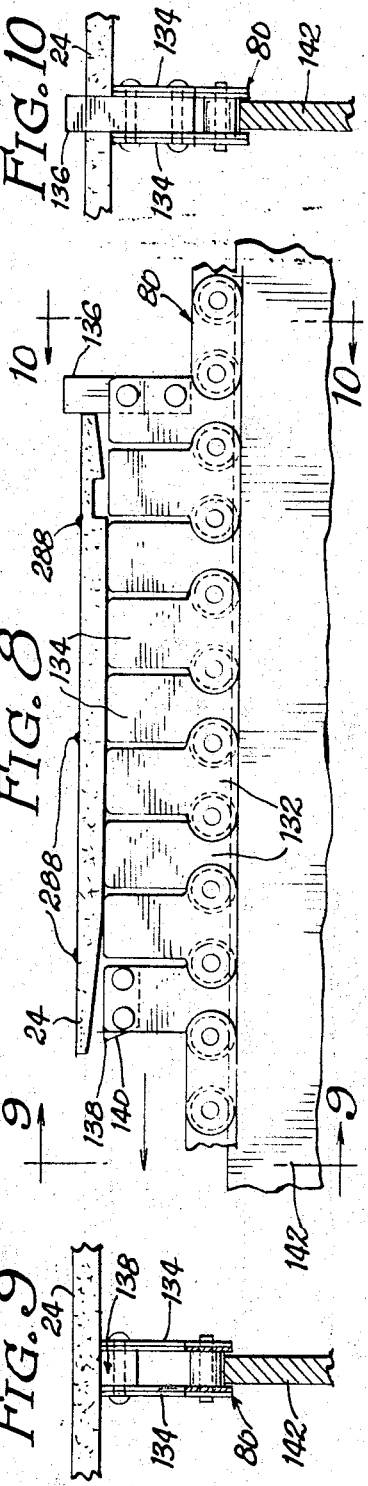
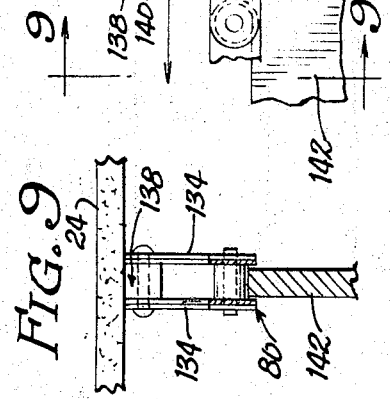

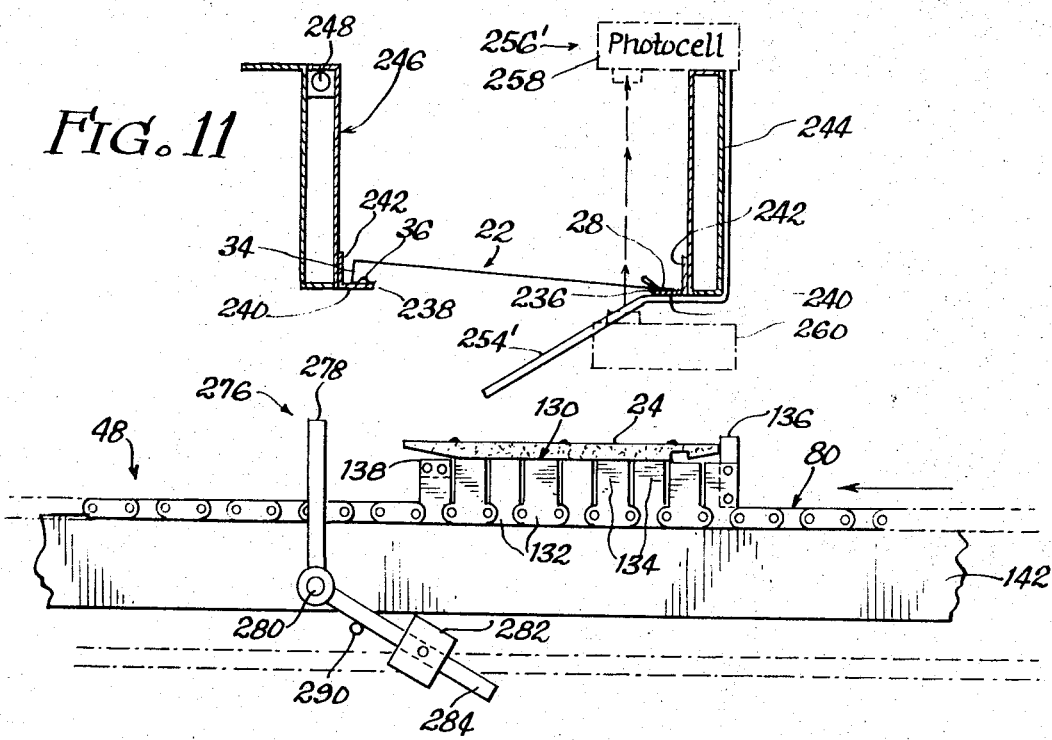
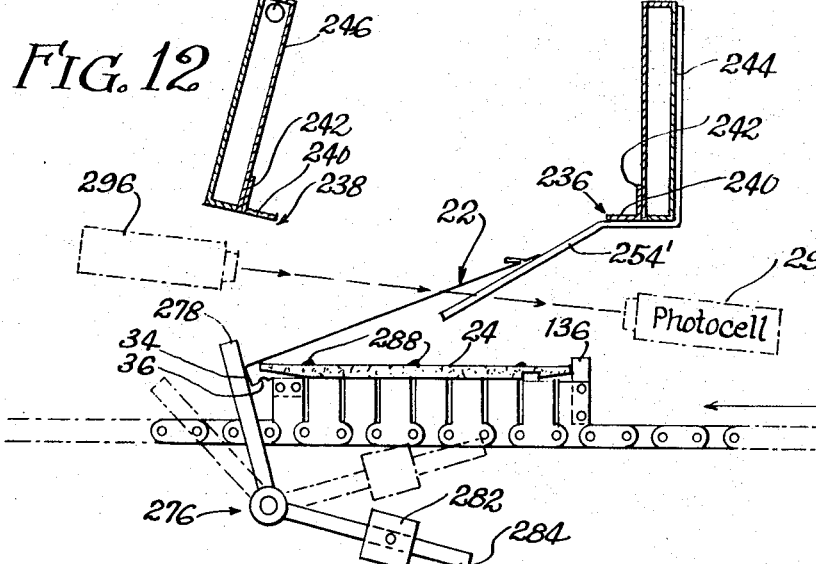
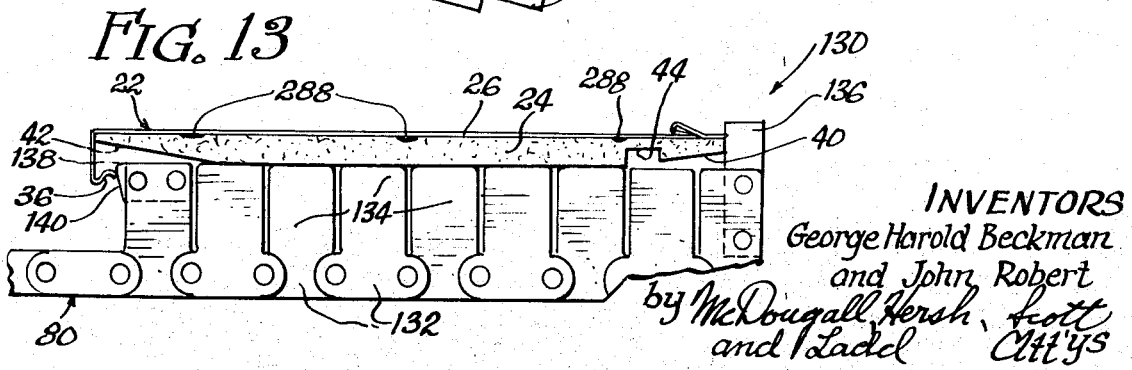

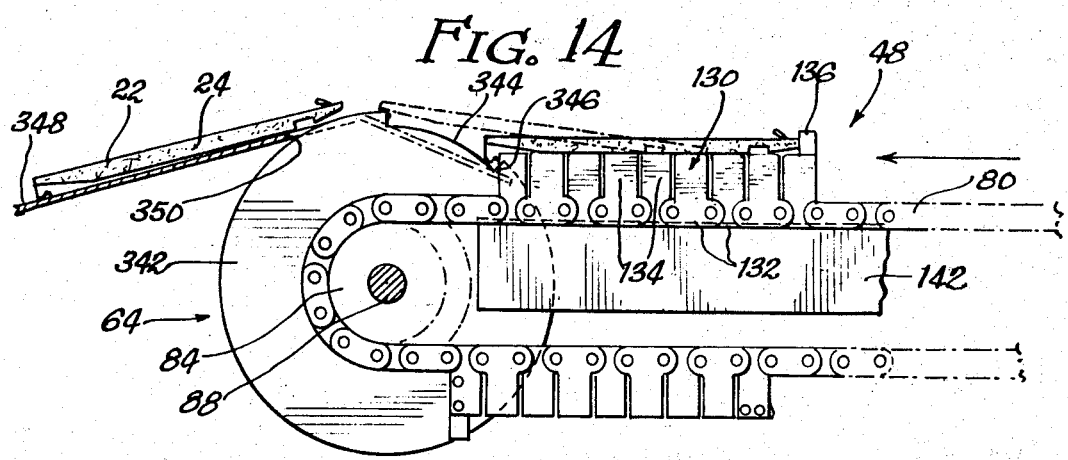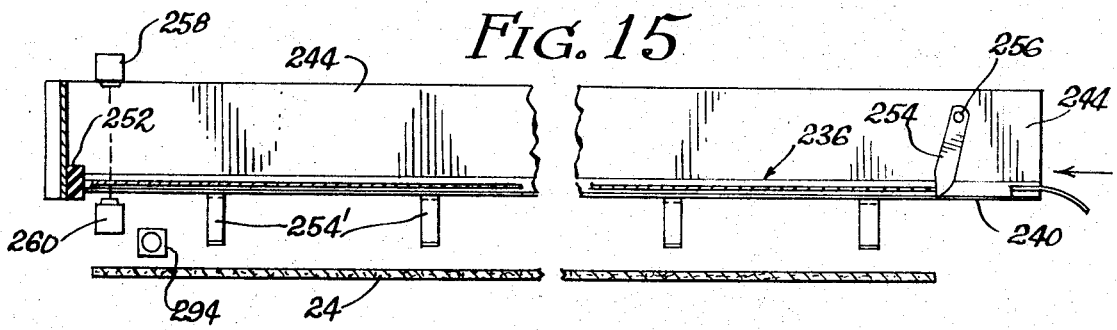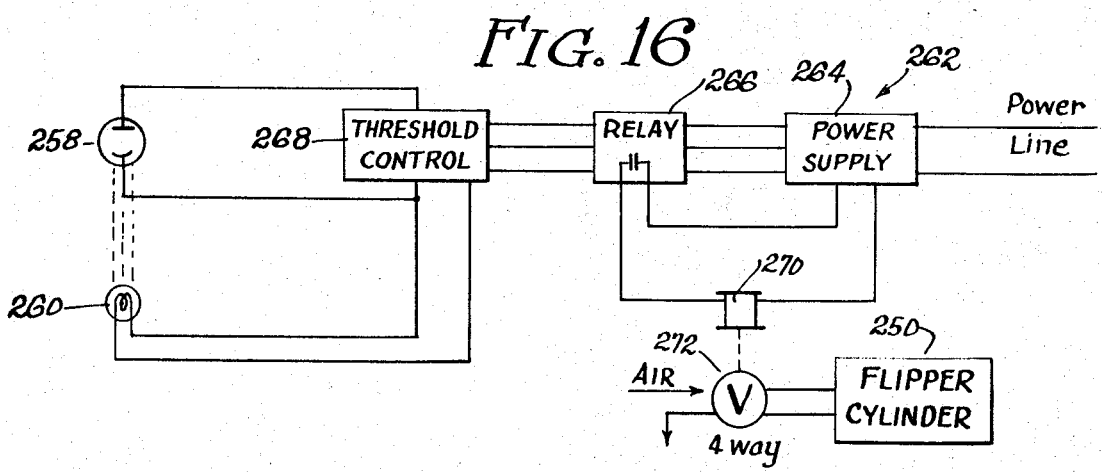

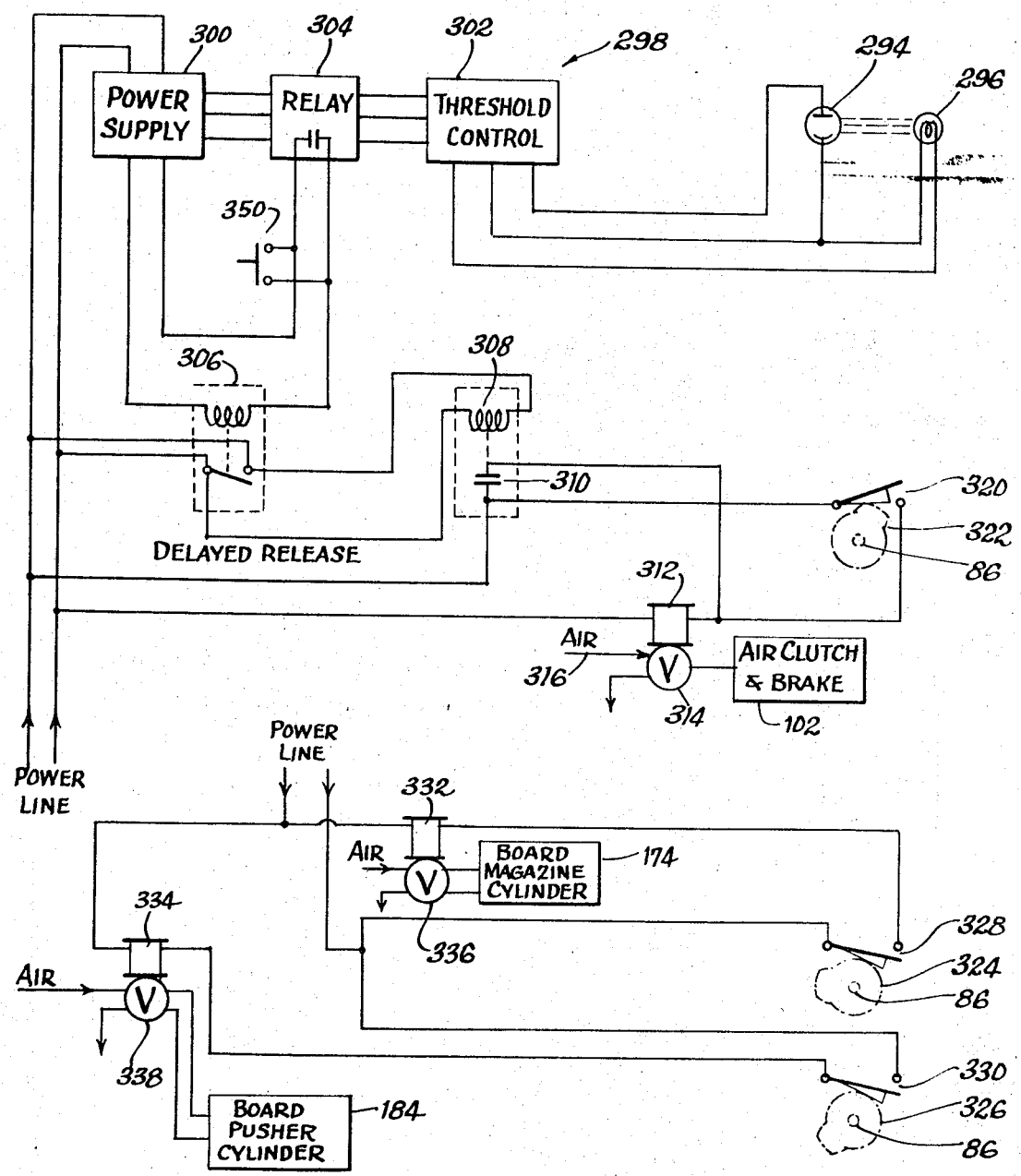

1

3,533,881
METHOD AND MACHINE FOR COMBINING
ELONGATED METAL PANELS WITH CORE
BOARDS
George Harold Beckman, Lowell, Ind., and John Robert, Chicago, Ill., assignors to Globe Industries, Inc., Chicago, Ill., a corporation of Delaware
Filed Apr. 14, 1966, Ser. No. 542,651
Int. Cl. G05g 15/00; B23q 7/10
U.S. Cl. 156—351                                15 Claims

ABSTRACT OF THE DISCLOSURE

The illustrated method and machine involve the production of metal covered siding or the like by assembling and uniting a core board with an elongated metal panel having a flange projecting laterally from one longitudinal edge portion of the panel. Each core board is fed from a magazine to a forwarding conveyor which carries the board longitudinally to a main conveyor. Glue is spread upon the upper surface of the board as it is moved longitudinally. The main conveyor carries the board transversely past an assembling station. Each metal panel is fed to a position over the assembling station. The flanged portion of the panel is then caused to swing downwardly by gravity so that the flange is moved into the path of the board. As the board moves past the assembling station, one longitudinal edge of the board picks up the flange and draws the remainder of the panel off its support so that the panel drops into full engagement with the board. The assembled siding is stacked and packaged.

---

This invention relates to a new and improved method and machine for automatically combining elongated metal panels with elongated core boards or material. The invention is applicable particularly to a method and machine for combining metal siding panels with core boards which serve as reinforcement and insulation for the metal siding panels.

One object of the present invention is to provide a new and improved method in which a series of core boards are moved transversely to their longitudinal dimension to a combining point or station, and in which the elongated metal panels are moved longitudinally to a position adjacent the combining station, and then are shifted or swung into the path of the core boards, whereby further movement of the core boards past the combining station will cause each core board to pick up the corresponding metal panel so as to be combined therewith.

A further object is to provide a new and improved machine for moving the core boards and the metal panels to the combining station, and for automatically coordinating and controlling the movements of the core boards and the metal panels, so that the boards and the panels will be combined to form a composite product.

It is a further object to provide a new and improved machine in which the movement of each metal panel to the combining station initiates the movement of a conveyor which carries the corresponding core board past the combining station so that the panel and the core board are automatically combined.

A further object is to provide a machine of the foregoing character in which the movement of the conveyor initiates the operation of a feeding device whereby another core board is fed to the conveyor.

Another object is to provide such a new and improved machine having means for controlling the rebounding tendency of the metal panels when they are brought to the combining station, so that the metal panels will be accurately aligned with the core boards at the combining station.

2

A further object is to provide a new and improved machine having means whereby the movement of each successive metal panel to the combining station activates a release mechanism whereby the panel is dropped or swung into the path of the corresponding core board, so that the panel and the board will be combined when the board is moved past the combining station.

A further object is to provide such a new and improved machine which operates at high speed, yet is capable of combining the core boards and the panels with a high degree of precision, so that the core boards will be accurately positioned and aligned relatively to the panels.

Further objectives and advantages of the present invention will appear from the following description, taken with the accompanying drawings, in which:

FIG. 1 is a diagrammatic plan view of a machine to be described as an illustrative embodiment of the present invention.

FIGS. 2 and 3 are perspective views of an elongated metal siding panel and an elongated core board, adapted to be combined into a composite product by the machine of FIG. 1.

FIG. 4 is a vertical section taken through the feed magazine for the core boards, generally along the line 4—4 in FIG. 1.

FIG. 5 is an elevational section taken generally along the line 5—5 in FIG. 4.

FIG. 6 is a vertical section showing the mechanism for feeding the core boards longitudinally to the main or combining conveyor, the view being taken generally along the line 6—6 in FIG. 1.

FIG. 7 is a diagrammatic elevational view of the combining conveyor, the view being taken generally as indicated by the line 7—7 in FIG. 1.

FIG. 8 is a fragmentary enlarged view showing one of the core boards in place upon one of the carriers of the combining conveyor.

FIG. 9 is a fragmentary vertical section taken generally along the line 9—9 in FIG. 8.

FIG. 10 is a fragmentary vertical section taken generally along the line 10—10 in FIG. 8.

FIG. 11 is a fragmentary vertical section taken through the combining station of the machine, generally along the line 11—11 in FIG. 1.

FIG. 12 is a view similar to FIG. 11 but showing various parts of the machine in changed positions, to illustrate the manner in which the metal panel is dropped or swung into the path of the corresponding core board, so that the panel will be combined with the board.

FIG. 13 is a view somewhat similar to FIG. 8, but showing the combined panel and core board, mounted on one of the carriers of the conveyor.

FIG. 14 is a fragmentary elevational view showing the mechanism for removing the composite product from the conveyor, the view being taken generally as indicated by the line 14—14 in FIG. 1.

FIG. 15 is a fragmentary elevational section taken through the combining station, generally along the line 15—15 in FIG. 1.

FIG. 16 is a circuit diagram showing the control arrangement for causing the panel to be dropped or swung into the path of the core board, when the panel arrives at the combining station.

FIG. 17 is a circuit diagram showing the control arrangement for starting and stopping the main or combining conveyor, so as to combine each core board with the corresponding panel at the combining station.

FIG. 18 is a circuit diagram showing the control arrangement for causing the successive core boards to be fed from the magazine to the main conveyor.

As already indicated, the drawings show an illustrative embodiment of the present invention in the form of a machine 20 for combining elongated metal panels with elongated core boards 24. The illustrated machine is intended primarily to be used in the production of siding for homes and other buildings. However, the invention is applicable generally to manufacturing operations in which panels are combined with core boards or the like.

The elongated metal panels 22 and the core boards 24 are illustrated to best advantage in FIGS. 2, 3, and 13. While the present invention may be employed with panels and boards of various constructions, it will be of interest to note some of the details of the specific panels and core boards shown in the drawings. As shown in FIGS. 2 and 13, the illustrated panel 22 comprises an elongated sheet metal member having a flat front wall 26. While the illustrated panel is made of aluminum or other suitable sheet metal, it will be understood that various other suitable materials may be employed. Thus, for example, the panels may be made of plastics or the like. In the usual case, the illustrated panels are made of aluminum. Normally, the front side of each panel is coated with paint or some other suitable material.

The upper edge of each of the illustrated panels 22 is formed with a nailing strip or flange 28, which is formed with slots or openings 30 for receiving nails or other fasteners, whereby the nailing flange may be secured to the side of a building. Just below the nailing flange 28, the illustrated panel 22 is provided with a retaining lip or flange 32 which is folded downwardly in front of the extreme upper portion of the front wall 26. The nailing flange 28 and the retaining lip 32 are preferably formed integrally with the front wall 26.

Along the lower edge of the front wall 26, the panel 22 is preferably formed with a bottom wall or flange 34 which is bent rearwardly from the front wall 26. As shown to best advantage in FIG. 13, a mounting flange 36 is preferably bent upwardly from the rear edge of the bottom flange 34. When the panel 22 is applied to the side of a building, only the front wall 26 and the bottom flange 34 are visible. The mounting flange 36 on the lower edge of each panel 22 is slipped under and retained by the retaining lip 32 of the underlying panel. Thus, the nailing flange 28 effectively retains not only the upper edge of each panel, but also the lower edge of the overlying panel.

Each panel is formed with cutouts or notches 37 and 38 which facilitate the overlapping of the panels when they are applied to the side of a building. The cutouts 37 are formed in the upper corners of the nailing flange 28. The cutouts 37 also extend into the ends of the lip 32. It will be seen that the cutouts 38 are formed in the ends of the mounting flange 36.

The elongated board 24 is adapted to serve as a core or liner for the metal panel 22. The metal panel 22 and the core board 24 are shown in their assembled relation in FIG. 13. It will be appreciated that the core board 24 stiffens and reinforces the metal panel 22 so that it has an increased resistance to impact and other types of stresses. At the same time the core board 24 provides heat insulation, so that the composite siding product will have a high heat insulating value. The core board 24 is normally made of a fibrous material which has a high heat insulating value and is strong and light in weight, yet is low in cost. It will be realized, however, that the core board 24 may be made of a wide variety of materials, no-fibrous as well as fibrous.

The illustrated core board 24 is generally in the form of a rectangular sheet or plank. However, the rear upper portion of the board 24 is formed with a beveled or inclined surface 40, adapted to abut against the side of the building when the siding is installed, so that the front wall 26 of the siding will be positioned at an inclined angle. The lower rear portion of the board 24 is formed with a similar beveled surface 42 so that the boards will be reversible at various stages in the manufacturing process. The illustrated board 24 is formed with a longitudinal groove or channel 44 which extends along the rear side thereof, near the upper edge of the board. The groove 44 is adapted to receive the mounting flange 36 of the adjacent panel 22 when the finished siding panels are stacked for packaging and shipment. The provision of such grooves in the core boards makes it possible to stack the siding panels on a level basis, despite the fact that the mounting flange 36 of each panel projects rearwardly beyond the rear side of the corresponding core board 24.

The general layout of the illustrated assembling machine 20 is shown to best advantage in FIG. 1. Generally, the machine 20 comprises a main or combining conveyor 48 which carries the successive core boards 24 to a combining point or station 50. The conveyor 48 carries the core boards 24 edgewise and in a direction transverse to their length.

The illustrated machine 20 is provided with a feed mechanism 52 which supplies the successive core boards to the main conveyor 48. Generally, the feed mechanism 52 comprises a magazine 54 adapted to hold a supply of the core boards. The individual core boards are fed edgewise out of the magazine to a feeding conveyor 56 which feeds the boards longitudinally onto the main conveyor 48.

A panel feeding conveyor 58 is also provided to feed the metal panels 22 lengthwise to the combining station 50. The panel feeding conveyor 58 causes each panel to travel across the main conveyor 48 so that the panel comes to rest in a position parallel to the corresponding core board, with which the panel is to be combined. At the combining station 50, a combining mechanism 60 causes the panel to drop or shift into the path of the corresponding core board. When the conveyor 48 is advanced, the core board picks up and carries away the panel.

A glue applicator 62 is preferably provided to apply a suitable adhesive to the core boards 24 as they are fed onto the main conveyor 48 by the board feed conveyor 56. When each board is brought together with the corresponding panel at the combining position 60 the adhesive forms a bond between the panel and the board.

At the end of the main conveyor 48, a delivery mechanism 64 is preferably provided to remove the completed siding panels from the conveyor. These siding panels may then be stacked and packaged for shipment. As shown in FIG. 7, the machine 20 is preferably provided with an intermittently movable conveyor 66 on which the finished siding panels may be stacked. A flat carton blank 68 is normally placed on the conveyors 66 before each stack of siding panels is started. A magazine 70 may be provided adjacent to the conveyor 66 to hold a supply of the carton blanks. In the illustrated arrangement, the successive carton blanks 68 are fed manually from the magazine 70 to the conveyor 66. When the desired number of siding panels have been stacked, the conveyor 66 is advanced so as to discharge the carton blank 68 and the stack of siding panels onto a packaging table or platform 72. The carton blank 68 may then be folded manually around the siding panels and closed by the use of glue, staples or other fastening devices. The carton of siding panels is then ready for shipment.

The details of the main or combining conveyor 48 are shown to best advantage in FIGS. 1, 7 and 8. It will be seen that the conveyor 48 comprises a plurality of parallel endless chains 80, which are trained around sprockets 82 and 84. Three such chains 80 are provided in the illustrated construction. The sprockets 82 and 84 are mounted on shafts 86 and 88.

One of the shafts is provided with a suitable drive for advancing the conveyor 48. In this case, the shaft 88 is driven, while the shaft 86 is caused to rotate by the movement of the conveyor. As shown in FIG. 7, an electrical motor 90 may be provided to advance the conveyor 48. As shown, motor 90 is connected to a speed reducing gear box 92 having an output shaft 94. A sprocket 96 is mounted on the shaft 94 and is connected by means of a chain 98 to a sprocket 100 on a combined clutch and brake unit 102. In this arrangement, the motor 90 runs continuously so that the sprocket 100 is continuously rotated. The clutch and brake unit 102 controls the transmission of power to a sprocket 104. When the clutch is engaged, the sprocket 104 is rotated. The clutch and brake unit 102 may be controlled by a compressed air system or other power means.

A suitable drive is provided between the sprocket 104 and the shaft 88. As show, a chain 106 is connected between the sprocket 104 and a sprocket 108 on a shaft 110. It will be seen that the shaft 110 carries another sprocket 112. A chain 114 is connected between the sprocket 112 and a sprocket 116 on a shaft 118. A second sprocket 120 is mounted on the shaft 118 and is connected by means of a chain 112 to a sprocket 124 on the conveyor shaft 88. It will be understood that the specific details of the drive for the conveyor are subject to a wide range of variation.

It will be seen that the conveyor 48 is provided with a plurality of carriers 130 for supporting the successive core boards 24. The carriers 130 are mounted on the chains 80. It wll be seen from FIG. 8 that each of the carriers 130 comprises a plurality of special links 132 which are connected into the chains 80. Each link 132 comprises a pair of upwardly projecting fingers 134 to support the core board 24 above the level of the chains 80. An upwardly projecting pusher bar 136 is mounted between the fingers 134 of the rearmost link 132 of each carrier 130. It will be understood that the pusher bars 136 are adapted to engage the rear edge of the core board 24 so that it will be positively advanced by the conveyor.

At the front end of each carrier 130, a block or pad 138 is mounted between the fingers 134 of the foremost link 132. The front upper edge of the block 138 overhangs an inclined surface 140. As shown in FIG. 13 the block 138 is adapted to engage the mounting flange 36 of one of the metal panels 22. This action will be described in greater detail shortly.

A bar or rail 142 is preferably provided to support the upper flight of each of the conveyor chains 80. It will be understood that the rails 142 support the weight of the chains 80 and the core boards 24, so that the core boards are moved along a substantially horizontal path between the sprockets 82 and 84.

The details of the magazine 54 for holding the supply of core boards 24 are shown to best advantage in FIGS. 4 and 5. It will be seen that the core boards 24 are stacked in the magazine 54 between front and rear walls 150 and 152. The lower end of the stack is supported by a bottom wall or plate 154. The top of the magazine 54 is open so that additional boards may be added to the stack, as needed.

The successive boards are fed out of the magazine from the bottom of the stack of boards. Thus, a gap or slot 156 is provided between the lower edge of the front wall 150 and the upper side of the bottom wall 154, so that the bottom board may be pushed out of the magazine. The gap 156 is wide enough to permit a single board to pass out of the magazine. The front wall 150 retains all of the boards in the magazine 54, other than the bottom board.

To eject the bottom board, the magazine 54 is provided with a pusher 158 which is in the form of a plate or bar moveable along the upper side of the lower wall 154. The pusher 158 is adapted to move through a slot or gap 160 between the bottom wall 154 and the lower edge of the rear wall 152.

Power means are preferably provided to operate the pusher 158. In this case, a plurality of parallel racks 162 are connected to the pusher 158. The racks 162 are formed with gear teeth 164 which mesh with pinions 166 on a rotatable shaft 168. An intermediate gear 170 is provided to mesh with one of the pinions 166, and also with a rack 172 adapted to be operated by an air cylinder 174. It will be understood that other power means may be employed to operate the pusher.

The air cylinder 174 is adapted to reciprocate the pusher 158. On the forward stroke of the pusher 158, the bottom board 24 is pushed out of the magazine 54 through the slot 156 in the lower portion of the front wall 150. The pusher 158 is then returned rearwardly between the stack of boards and the bottom wall 154, until the pusher reaches its original position, as shown in FIG. 4. The stack of boards then drops downwardly in the magazine so that the lowermost board is ready to be fed out of the magazine. The lower wall or plate 154 extends in front of the magazine to support the core board 24 after it has been ejected from the magazine. A stop bar 176 is provided for engagement by the front edge of the board to limit the forward movement of the board.

FIGS. 1 and 5 illustrate the details of the board feeding mechanism 56 which feeds the successive boards longitudinally onto the main conveyor 48, after the boards have been ejected from the bottom of the mechanism 54. It will be seen that the board feeding mechanism 56 comprises a pusher 178 which is adapted to engage one end of the board and to push the other end of the board between a pair of feed rollers 180 and 182. In this case, an air cylinder 184 is provided to operate the pusher 178, but it will be understood that various power means may be provided for this purpose. The air cylinder 184 is adapted to reciprocate the pusher 178 along the upper side of the supporting plate 154.

It is preferred that the feed rollers 180 and 182 be continuously driven so that the core board 24 will be rapidly propelled off the platform 154 as soon as the board is fed between the rollers. Thus, the lower feed roller 182 may be continuously driven by a variable speed motor 186. The upper feed roller 180 may also be driven by means of a suitable gear drive 188 connected between the two rollers 180 and 182. Springs 190 are preferably provided to press the rollers 180 and 182 against the core board 24 when it is being fed between the rollers. As shown, the springs 190 are connected to the bearing blocks 192 for the upper roller 180, so that the upper roller will be pressed downwardly against the core board 24.

The pusher 178 only needs to move the core board 24 far enough so that it is fed between the rollers 180 and 182. The pusher 178 may then be returned to its original position as shown in FIG. 5.

The feed rollers 180 and 182 rapidly propel the core board into a position over the main conveyor 48. As shown in FIG. 6, a series of rollers 196 are provided to support the core board 24 as it moves over the conveyor chains 80. A series of plates or platforms 198 are provided to guide the core board 24 between the successive rollers 196.

A cushioning device 200 is preferably provided to arrest the movement of the core board 24 so that it will be brought to a halt in the desired position over the main conveyor 48, without damaging the end of the board, and without excessive bouncing of the board. As shown, the cushioning device compresses a stop bar 202 which is L-shaped in cross-section, so as to provide a channel adapted to receive the end of the core board 24. The stop bar 202 is mounted on a plurality of rods or members 204 which are slidable through a bearing member 206. When the core board 24 engages the stop bar 202, the stop bar and the rods 204 are moved to the right, as seen in FIG. 6, but such movement is resisted by springs 208, which are effective to return the stop bar to its original position so that the core board 24 will be properly positioned over the conveyor 48.

The rollers 196 preferably support the core board 24 at an elevation silghtly above the upper ends of the carrier fingers 134 on the conveyor chains 80. Thus, the carrier fingers 134 are able to move under the core board 24 without disturbing the board. However, the pusher bars 136 project upwardly a sufficient distance to engage the edge of the core board, so that the pusher bars are effective to push the core board edgewise off the rollers 196. As the core board moves off the rollers 196, it drops down onto the carrier fingers 134.

A guide bar or rail 209 is provided, as shown in FIG. 1, to engage and position the end of each core board 24 as it is advanced by the pusher bars 136 of the conveyor 48. The guide bar 209 extends along the conveyor 48 from a point near the cushioning device 200 to a point near the combining station 50. Preferably, the guide bar 209 extends at an angle which is slightly oblique or diagonal to the direction of the conveyor 48, so that each core board 24 is pushed longitudinally to the left, as shown in FIG. 1, into the correct position for precise alignment with the corresponding panel 22. One end of the guide bar 209 is mounted on a bracket member 210, which is secured to the bar member 206 for the cushioning device 200. The other end of the guide bar 209 is provided with an adjustable mounting bracket 211 which makes it possible to adjust the angle of the guide bar so that it will move each core board longitudinally to the desired position.

As shown in FIG. 1, the glue applicator 62 is effective to supply a plurality of ribbons of glue to the upper side of the core board as it passes from the feed rollers 180 and 182 to the main conveyor 48. The glue applicator 62 may comprise a plurality of nozzles 212 through which glue is forced under pressure onto the core board 24. The nozzles 212 are located above the path of the core board, in the space between the main conveyor 48 and the feed rollers 180 and 182.

Means are provided whereby the operation of the glue applicator 62 is controlled by the movement of the core boards. Thus, a first switch 214 is provided to initiate the operation of the glue applicator 62 so that glue under pressure will be supplied to the nozzles 212. The switch 214 is preferably positioned adjacent to the nozzle 212 so that the leading end of each core board operates the swtich as it passes under the glue nozzle 212.

A second switch 216 is preferably provide for stopping the operation of the glue applicator 62. It will be seen that the second switch 216 is spaced a considerable distance from the first switch 214 so that the second switch will be engaged by the leading end of the core board, shortly before the trailing end of the core board passes under the glue nozzles 212. The switches 214 and 216 are positioned so as to allow for the slight lag or delay in the control of the glue applicator, after the switches have been operated.

The details of the panel feeding mechanism 58 are shown to best advantage in FIGS. 1, 11, 12, and 15. The present invention is not concerned with the method of forming the metal panels, but rather is concerned with the method and means for combining the metal panels with the core boards 24. However, it is normally convenient to form the metal panels 22 just before they are delivered to the panel feeding mechanism 58. The metal panels 22 are normally formed from a continuous strip of metal. A traveling shear or cutter 220 is preferably provided to cut the successive metal panels 22 from the continuous strip, without interrupting the movement of the strip. Thus, a continuous strip 222 of preformed metal siding may be fed at a constant speed to the traveling shear 220. It will be understood that the traveling shear 220 is effective to sever the panels 22 from the continuous strip in such a manner that the panels will be of the desired length.

After passing under the traveling shear 220, the strip 222 is supported by a series of horizontal guide rollers 224. The strip then passes over a series of feed rollers 226 which may be continuously driven at a constant speed. A series of horizontal guide plates 228 may be provided to carry the strip 222 between the feed rollers 226. In the illustrated construction, a pair of side rails 230 and 232 are provided to guide the edges of the strip 222.

After the desired length of the strip 222 has passed onto the feed rollers 226, the shear 220 is operated so as to sever one of the metal panels 22 from the strip. The feed rollers 226 are preferably driven at a surface speed greater than the speed of movement of the strip 222. Thus, as soon as the panel 22 is severed from the strip, the panel is accelerated by the feed rollers 226 and is forwarded rapidly away from the leading end of the strip. The feed rollers 226 may be covered with rubber or some other similar material, to provide an effective friction drive between the rollers and the successive panels 22. It will be seen from FIG. 1 that a holddown roller 234 is provided over the last of the feed rollers to press the metal panels lightly against the feed roller.

The feed rollers 226 are effective to propel each metal panel 22 across the main conveyor 48, at a level above that of the core boards 24, so that each metal panel is brought to a position over the combining station 50. The metal panels 22 are propelled along and supported by a pair of guide rails or bars 236 and 238. The illustrated rails 236 and 238 are L-shaped in cross-section, so as to provide horizontal flanges 240 to support the panels 22, and vertical flanges 242 to guide the edges of the panels.

In the illustrated construction, the rail 236 is fixed in position. Thus, it may be supported by a fixed cross member or beam 244 extending across the conveyor 48. The other rail 238 is movably mounted so that the panel 22 may be released for movement into combined relation with the corresponding core board 24. Thus, the rail 238 is preferably mounted on a movable cross member or flipper 246. As shown, the flipper 246 is swingably supported by a shaft 248. An air cylinder 250 or other power means may be provided to swing the flipper 246 between the initial position shown in FIG. 11 and the displaced or released position shown in FIG. 12.

The feed rollers 226 are effective to propel each successive panel 22 at considerable speed along the rails 236 and 238. A pad or stop 252 is preferably provided to arrest the movement of the panel when it arrives over the combining station 50. The pad 252 is preferably made of rubber or similar material, to avoid damaging the leading end of the metal panel.

Means are preferably provided to control and limit the tendency of the metal panel to rebound when it engages the pad 252. In the illustrated arrangement, as shown to best advantage in FIG. 15, a dog or pawl 254 is provided to arrest the rebounding movement of the metal panel 22. The dog 254 acts as a one-way stop, to permit the panel to move along the rails 236 and 238 toward the pad 252 while arresting the return or rebounding movement of the panel. It will be seen that the dog 254 is in the form of an arm or finger which is freely swingable about a pivot 256 on the fixed supporting member 244. The dog 254 is long enough so that its lower end engages the horizontal flange 240 of the fixed side rail 236 when the dog is in its initial position, as shown in FIG. 15. Gravity tends to hold the dog 254 in this position. It will be seen that the dog 254 is inclined downwardly in the direction in which the metal panel 22 is to travel. Thus, the metal panel is able to move freely past the dog 254 as the panel travels toward the pad 252. The panel engages the lower end of the dog 254 and swings it upwardly so that the panel slides past the lower end of the dog. The dog is preferably positioned so that it engages the nailing flange 28 on the panel.

As soon as the panel 24 moves completely past the dog 254, it drops downwardly by gravity and against the horizontal flange 240. When the panel rebounds, it encounters the lower end of the dog and is unable to move past the dog. Thus, the dog 254 arrests the rebounding panel in the desired position over the conveyer 48.

It will be seen from FIG. 11 that the nailing flange 28 of the panel 24 is supported on the rail 236, while the mounting flange 236 is supported on the rail 238. When the flipper 246 is swung clockwise to its released position, as shown in FIG. 12, the rail 238 is moved to the left, out from under the mounting flange 36. Thus, the metal panel 22 drops downwardly until it engages the underlying core board 24. An inclined apron or ramp 254' is provided to support the nailing flange 28 of the panel so that the panel will drop down into an inclined position.

The dropping of the panel 22 by the flipper 246 causes the bottom flange 34 of the panel to move into the path of the underlying core board 24. Thus, when the conveyor 48 is advanced, the core board 24 engages the bottom flange 34 and picks up the panel 22. The panel 22 slides down the ramp 254' and eventually drops off the ramp and onto the core board, as shown in FIG. 13.

Means are preferably provided whereby the movement of the panel 22 controls the actuation of the flipper 246. Thus a control device 256' is provided to actuate the flipper 246 when the metal panel 22 is moved into position over the combining station 60. The control device may assume various forms, but is illustrated as comprising a photocell 258 which is normally illuminated by a lightbeam from a light source 260. The photocell 258 and the light source 260 are positioned so that the light beam is interrupted by the metal panel 22 just before it engages the stop or pad 252. Thus, the photocell 258 and the light source 260 are positioned adjacent to the pad 252 and on opposite sides of the path of the panel 22. In this case, the photocell 58 is above the path of the panel, while the light source 260 is below, but the positions can be reversed.

As shown in FIG. 16, the photocell 258 and the light source 260 are connected to a photocell control unit 262 of the usual type, comprising a power supply 264, an output relay 266, and a threshold control 268. The relay 266 is connected to a solenoid 270 which is adapted to operate a control valve 272. It will be seen that the control valve 272 is adapted to control the supply of air to the cylinder 250, which actuates the flipper 246. When the photocell 258 is illuminated, the valve 272 is operated to a position such that the flipper is moved to its initial position, as shown in FIG. 11. When the lightbeam to the photocell 258 is interrupted by the metal panel 22, the valve 272 is reversed, whereupon the flipper cylinder 250 moves the flipper 246 to its released position, as shown in FIG. 12. The flipper 246 is returned to its original position immediately after the rear edge of the nailing flange 28 has passed the light beam from light source 260 with the result that the lightbeam is falling on photocell 258.

A retarding device 276 is preferably provided to hold back the panel 22 so that it will be combined at the proper position with the core board 24. As shown, the retarding device 276 takes the form of a plurality of arms 278 which project upwardly into the path of the panel 22. The arms 278 are also in the path of the core board 24. In the illustrated construction, the arms 278 are mounted on a rotatable shaft 280. A biasing effect is provided by a weight 282 which is adjustably mounted on another arm 284 secured to the shaft 280. In its initial position, the arm 284 is inclined downwardly from the shaft 280.

As shown in FIG. 12, the bottom flange 34 of the panel 22 engages the arms 278 which hold back the panel until the conveyor 48 starts to advance the panel. In this case, the panel 22 is picked up initially by the pad or block 138 on the front of the corresponding carrier 130 of the conveyor 48. The pad 138 engages the mounting flange 36 of the panel 22, as shown in FIG. 12. The movement of the conveyor then causes the arms 278 to be swung counterclockwise against the biasing action of the weight 282. As the conveyor is advanced, the arms 278 hold back the panel so that it swings downwardly onto the core board 24 and comes to rest in the correct position, as shown in FIG. 13. The panel 22 engages the ribbons or strips 288 of glue, which were previously applied to the board 24 by the glue applicator 62. The glue is effective to secure the front wall 26 of the panel 22 to the upper side of the core board 24.

The advancing movement of the conveyor 48 causes the carrier 130, the core board 24, and the panel 22 to pass over the arms 278. The weight 282 then causes the arms 278 and 284 to swing clockwise to their original positions. The return movement of the arms 278 and 284 is limited by a stop 290.

It is preferred to control the movement of the conveyor 48 in accordance with the movement of the panel 22 into the path of the corresponding core board 24 on the conveyor. Thus, the advancing movement of the conveyor is preferably initiated when the panel 22 is dropped downwardly by the releasing movement of the flipper 246. Various means may be provided to control the movement of the conveyor, but it is preferred to employ a photocell 294, which is normally illuminated by a light beam from a light source 296. It will be understood that the positions of the photocell 294 and the light source 296 may be reversed, if desired. When the panel 22 drops off the ledge 238 due to the releasing movement of the flipper 246, as shown in FIG. 12, the panel interrupts the light beam. The resulting signal from the photocell 294 is preferably employed to start the conveyor 48 so that the panel is picked up and combined with the corresponding core board, as already described.

As shown in FIG. 17, the photocell 294 may be connected to a control unit 298 of the usual type, comprising a power supply 300, a threshold control 302, and a relay 304. The relay 304 is connected to a timing relay 306 having a dash pot or other timing device to provide a delayed release characteristic. When the light beam to the photocell 294 is interrupted, the relay 304 energizes the relay 306, which in turn energizes a power relay 308. It will be seen that the relay 308 has contacts 310 which are connected to a solenoid 312 adapted to actuate a control valve 314. As shown, valve 314 is connected between a compressed air line 316 and the air operated clutch and brake unit 102.

When the power relay 308 is energized by the closure of the timing relay 306, the valve 314 is actuated so as to supply compressed air to the air clutch and brake 102. As a result, the clutch is engaged and the brake is disengaged so that the main conveyor 48 is advanced by the electrical motor 90.

As the conveyor 48 is advanced by the motor 90, the panel 22 is picked up and combined with the core board 24, as already described. As a result, the panel 22 is moved out of the light beam from the light source 296, so that the photocell 294 is again illuminated. To provide for the continued movement of the conveyor 48, a holding circuit is established around the relay contacts 310 by a switch 320 which is operated by a cam 322. As shown in FIG. 1, the cam 322 is secured to the conveyor shaft 86 so that the cam is rotated concurrently with the advancing movement of the conveyor. Initially the cam 322 holds the switch 320 in an open position, as shown in FIG. 17. The initial movement of the conveyor 48 under the control of the photocell 294 and the timing relay 306 causes the cam 322 to rotate sufficiently to allow the switch 320 to close. The conveyor then continues to operate until the cam 322 rotates through a complete revolution, whereupon the cam again opens the switch 320, so as to stop the conveyor. The rotation of the cam 322 and the shaft 86 through a single revolution is sufficient to advance the conveyor 48 by an amount corresponding to the distance between the centers of the successive core boards 24 on the carriers 130 of the conveyor. Thus, for each revolution of the cam 322, one of the core boards 24 is combined with the corresponding panel 22 at the combining station 50 while the next core board is brought to the combining station.

It has already been indicated that the successive core boards 24 are fed to the main conveyor 48 by the board magazine cylinder 174, as shown in FIG. 4, and the board feeding or pusher cylinder 184 as shown in FIG. 5. As shown in FIG. 18, it is preferred to provide means whereby the magazine cylinder 174 and the pusher cylinder 184 are controlled in accordance with the advancing movement of the main conveyor 48. In the illustrated arrangement, cams 324 and 326 are provided to control the cylinders 174 and 184. As in the case of the cam 322, the cams 324 and 326 are preferably mounted on the conveyor shaft 86, as shown in FIG. 1. In the control arrangement of FIG. 18, the cams 324 and 326 are adapted to operate normally open switches 328 and 330 which are connected to solenoids 332 and 334. It will be seen that the solenoids 332 and 334 are adapted to operate valve 336 and 338 which control the supply of compressed air to the magazine cylinder 174 and the pusher cylinder 184.

When the conveyor 48 is advanced, the cam 324 closes the switch 328. Accordingly, the magazine cylinder 174 is actuated so as to advance the feed plate or pusher 158 of the magazine 54. As previously described, the lowermost board 24 in the magazine is fed out of the magazine through the slot 156. The switch 328 is caused to open by the continued rotation of the cam 324, whereupon, the magazine feed plate 158 is retracted to its original position.

The rotation of the cam 326 closes the switch 330, whereupon the pusher cylinder 184 is actuated to push the board 24 longitudinally in front of the magazine and between the feed rollers 180 and 182. Further movement of the cam 326 causes the switch 330 to be opened, whereupon the pusher 178 is retracted to its original position. The timing of the cam 326 is delayed relative to that of the cam 324 so that there is no interference between the operation of the magazine cylinder 174 and the pusher cylinder 184. The actuation and return movement of the magazine cylinder 174 are completed before the pusher cylinder 184 is actuated. Moreover, the pusher cylinder 184 is returned to its original position before the magazine cylinder 174 is again actuated.

The timing of the cams 324 and 326 is also coordinated with the advancing movement of the main conveyor 48 so that each core board is fed to the main conveyor in the proper timed relationship to be picked up by the pusher bars 136 of the corresponding carrier 130 on the conveyor. This action has already been described and is illustrated in FIGS. 6 and 7.

FIG. 14 illustrates the details of the delivery mechanism 64 for removing the assembled siding panels from the main conveyor 48. It will be seen that a plurality of delivery discs or wheels 342 are mounted on the conveyor shaft 88. Each disc 342 is generally circular, but is formed with a notch or cutout 344 adapted to receive the bottom flange 34 and the mounting flange 36 of each successive panel 22 on the conveyor. It will be seen that each disc 342 is substantially larger in diameter than the sprockets 84 of the conveyor 48. As each panel 22 is brought by the conveyor 48 to the delivery discs 342, the mounting flange 36 enters the notches 344 in the discs and is picked up by radial shoulders 346 which are formed at the trailing ends of the respective notches. The rotation of the discs 342 causes each panel 22 to be lifted off the corresponding carrier 130. The panels 22 are removed from the delivery discs 342 by a plate or ramp 348 which is inclined downwardly so that the panels will slide onto the delivery conveyor 66. It will be seen from FIGS. 1 and 14 that the delivery discs 342 extend upwardly into notches 350 formed in the plate 348. Each panel 22 is intercepted by the inclined plate 348 as the panel is carried off the conveyor 48 by the delivery discs 342.

It may be helpful to summarize the operation of the illustrated machine 20, although the operation has already been described in detail in the foregoing description. When the machine 20 is to be started, a stack of the core boards 24 is placed in the board magazine 54. As shown in FIG. 17, a manually operable switch 350 is preferably provided to initiate the operation of the main conveyor 48, so that an initial series of the core boards may be fed to the main conveyor. The closure of the manually operable switch 350 has the same effect as the interruption of the light beam to the photocell 294. Thus, the closure of the switch 350 energizes the timing relay 366 which, in turn, energizes the relay 308 and the control valve 314, so as to actuate the clutch and brake unit 102. The engagement of the clutch causes the conveyor 48 to be driven by the electrical motor 90. The advancing movement of the conveyor 48 continues for one revolution of the conveyor shaft 86, whereupon the cam 322 opens the switch 320 and thereby causes the disengagement of the clutch unit 102.

When the main conveyor 48 is actuated, the control system of FIG. 18 causes the core board 24 to be fed out of the magazine and onto the conveyor. The cam 324 rotates with the conveyor shaft 86 and closes the switch 328 so as to actuate the air valve 336 for the magazine cylinder 174. The resulting actuation of the cylinder causes the pusher plate 158 to be advanced so as to feed the lowermost core board 24 out of the magazine 54. The plate 158 is retracted when the switch 328 is opened by the further rotation of the cam 324.

The cam 326 also rotates with the conveyor shaft 86 and closes the switch 330 so as to operate the air valve 338 for the pusher cylinder 184. As a result, the pusher 178 is advanced so that the core board 24 is fed longitudinally between the constantly rotating feed rollers 180 and 182 (FIG. 5). The rollers 180 and 182 cause the core board to travel rapidly over the guide rollers 196 until the movement of the core board is arrested by the cushioning device 200, as shown in FIG. 6. The core board is thus brought to rest in the path of the pusher bars 136 which push the core board edgewise off the rollers 196 and on to the underlying carrier 130 of the conveyor.

The switch 350 is operated several times so as to advance the main conveyor 48 through several successive cycles, until one of the core boards 24 is brought to the combining station 50.

The machine 20 is set into actual operation by feeding the metal panels 22 to the machine, as shown in FIG. 1; the successive panels are severed from the continuous strip 222 of preformed metal siding by the traveling sheer 220. The strip 222 may be formed by a separate machine which delivers the strip to the sheer 220.

After each metal panel 22 has been severed from the strip 222, it is forwarded rapidly over the main conveyor 48 by the constantly rotating rollers 226. The metal panel is slid along the rails 236 and 238, as shown in FIGS. 11 and 15. The movement of the panel 22 is arrested by the pad or stop 252. It will be recalled that the panel tends to rebound from the pad 252, but is arrested in the desired position by the dog or pawl 254. When the panel 22 is fed along the rail 236 toward the pad or cushion 252, the dog 254 is swung upwardly so as to allow the panel to pass. Following the passage of the panel 22, the dog 254 drops down against the ledge 240 so as to arrest the panel in its rebounding movement from the cushion 252.

As the panel 22 arrives at the cushion 252, it interrupts the light beam between the light source 260 and the photocell 258. The control system of FIG. 16 causes the valve 272 to actuate the flipper cylinder 250, which swings the flipper 246 to its released position, as shown in FIG. 12. As a result, the panel 22 drops down against the underlying core board 24 on the conveyor 48.

In dropping off the ledge 240 on the flipper 246, the panel 22 interrupts the light beam between the light source 296 and the photocell 294. The control system of FIG. 17 thereupon causes the valve 314 to actuate the clutch and brake unit 102, so that the main conveyor 48 is advanced by the motor 90. When the conveyor shaft 86 has rotated through one revolution, the cam 322 opens the switch 326 so as to stop the conveyor 48.

The advancing movement of the conveyor 48 causes the metal panel 22 to be picked up and combined with the underlying core board 24, as shown in FIGS. 12 and 13. The arms 278 of the retarding device 276 hold back the metal panel 22 so as to insure that the metal panel will be properly aligned with the core board 24. The advancing movement of the conveyor 48 causes the panel 22 to push the arms 278 in a counter-clockwise direction against the biasing action of the weight 282, until the panel 22 and the core board 24 pass over the arms 278. The weight 282 then causes the arms 278 to return to their initial positions, as shown in FIG. 11.

While the conveyor 48 is being advanced, another core board 24 is fed from the magazine 54 and onto the conveyor, in the manner already described. It will be recalled that the cam 324 on the conveyor shaft 86 closes the switch 328 and causes the valve 336 to actuate the magazine cylinder 174. Subsequently, the cam 326 on the shaft 86 closes the switch 336 and causes the valve 338 to actuate the pusher cylinder 184, so that the core board is fed longitudinally over the conveyor 48. The board is then picked up by the pusher bars 136 so that the board drops onto the corresponding carrier 130 of the conveyor.

After the panel 22 is combined with the board 24, the conveyor 48 carries the combined or finished product to the delivery discs 342, which remove the finished product from the conveyor and deliver it to the ramp or plate 348, as shown in FIG. 14. The finished product is moved down the ramp 348 and onto the carton blank 68 on the conveyor 66. After the desired number of siding panels have been stacked on the conveyor 66, the conveyor is actuated so as to transfer the stack and the carton blank 68 to the packaging table 72. The carton blank 62 is then folded and closed so as to pack the siding panels. A new carton blank is fed manually from the magazine 70 onto the conveyor 66.

The metal panels 22 are secured to the core boards 24 by the ribbons of adhesive 288, as shown in FIG. 13. The stacking and packaging of the siding panels causes the metal panels 22 to be pressed firmly against the core boards 24. The adhesive or glue is applied to the core boards by the glue applicator 62, as the core boards are fed longitudinally onto the main conveyor 48. The supply of glue to the nozzles 212 of the applicator 62 is controlled by the switches 214 and 216 which are engaged and operated by the core board as it moves onto the conveyor 48.

It will be apparent that the illustrated machine 20 automatically combines the metal panels 22 and the core boards 24, with the proper timing and alignment. The movement of each successive metal panel 22 to the combining station 50 automatically causes the panel to be released so that it moves into the path of the corresponding core board. The movement of the core board is then automatically initiated so that the panel is picked up and combined with the core board.

The operation of the illustrated combining machine 20 is rapid and dependable so that the machine is capable of a high level of production. The operation of combining the panels with the core boards is carried out in such a manner that it does not require any attention from the operators of the machine. Thus, the machine substantially increases the productivity of the machine operators.

The illustrated machine is capable of combining the core boards and the panels with a high degree of precision, so that the core boards will be properly aligned with the panels. It has been found that the machine achieves a higher level of accuracy and consistency than is possible when the core boards and the panels are combined manually under production conditions. Thus, the machine maintains the quality of the finished product at a high level.

In addition, the combining machine makes it possible to use longer core boards. Normally, the core boards are slightly shorter than the cover panels to make it possible to overlap the cover panels, while also allowing a margin for error in the alignment of the core boards with the panels. Thus, in the usual practice, it is typical to allow a margin of about one-half inch to provide for overlapping of the panels, plus an additional margin of about three fourths of an inch to allow for errors in the alignment of the core boards with the panels. When the illustrated machine is employed to assemble the core boards and the panels, the total margin may be considerably reduced, because only a small margin is necessary to allow for possible errors in the alignment of the core boards with the panels. A reduction in the margin requirements makes it possible to use longer core boards. This is highly advantageous because the longer core boards provide additional insulation and also greater stiffness and strength at the points between the panels when applied as siding to a building. It will be understood that in the usual practice, the cover panels are not insulated at the joints for a distance corresponding to the margins which are left to provide for errors in the alignment of the core boards with the panels. By using longer core boards, the insulated area at the joints will be considerably reduced in width. Moreover, the panels are backed up and stiffened to a greater extent at the joints.

When the panels are installed on the side of the building, the panels are overlapped by an amount slightly less than the size of the cutouts 37 and 38, to allow for thermal expansion of the panels. Typically, the cutouts have a width of one-half inch, while the panels are overlapped about three-eighths of an inch, to allow one-eighth of an inch for thermal expansion. When the machine of the present invention is employed to assemble the core boards and the panels, the uninsulated portion of the overlapping panels at each joint is only slightly wider than the amount of overlap.

It will be recalled that the precise positioning of the core boards 24 is due largely to the provision of the cushioning device 200 and the angling guide bar 209. The accurate positioning of the cover panels is largely due to the provision of the locating dog or pawl 254, as shown in FIG. 15. The panels 22 and the core boards 24 are brought to the combining station 50 in accurate alignment, and then are combined in such a manner that the accurate alignment is maintained.

We claim:
1. In a machine for combining core members with cover panels of a type having a flange projecting laterally from one edge of each panel,
the combination comprising a conveyor for carrying a series of the core members along a predetermined path to a combining station and then past the combining station,
core member feeding means for loading the successive core members upon said conveyor,
panel feeding means for feeding the successive panels to a position adjacent and generally parallel to the core member at the combining station,
panel shifting means for tilting each successive panel to bring its flange into the path of the core member at the combining station,
each panel thereby being picked up by a corresponding core member as the core member is moved past the combining station by said conveyor,
and means for guiding each successive panel into fully combined relation with the corresponding core member on said conveyor as said core member is moved past the combining station,
said panel shifting means comprising a movable member for supporting the flange of said panel,
and means for moving said member away from said panel to release said panel for tilting movement by gravity,
whereby the flange on the panel is brought into the path of the core member at the combining station.
2. In a machine for combining core members with cover panels of a type having a flange projecting laterally from one edge of each panel, the combination comprising a conveyor for carrying a series of the core members along a predetermined path to a combining station and then past the combining station, core member feeding means for loading the successive core members upon said conveyor, panel feeding means for feeding the successive panels to a position adjacent and generally parallel to the core member at the combining station, panel shifting means for tilting each successive panel to bring its flange into the path of the core member at the combining station, each panel thereby being picked up by a corresponding core member as the core member is moved past the combining station by said conveyor, means for guiding each successive panel into fully combined relation with the corresponding core member on said conveyor as said core member is moved past the combining station, a pair of spaced rails for supporting the opposite edge portions of the panel in its position adjacent the combining station, one of said rails being adapted to support the flange on said panel, said panel shifting means comprising a swingable member supporting said one rail, and means for swinging said swingable member to move said one rail out from under said flange.

whereby said panel is released for downward tilting movement by gravity to bring said flange into the path of the core member at the combining station.

3. In a machine for combining elongated core boards with elongated cover panels of a type having a flange projecting laterally from one edge of each panel, the combination comprising a conveyor for carrying a series of the core boards in a laterally edgewise direction along a predetermined path to a combining station and then past the combining station, core board feeding means for loading the successive core boards upon the conveyor, control means for actuating said core board feeding means in accordance with the movement of said conveyor, panel feeding means for feeding the successive panels to a position adjacent and generally parallel to the core board at the combining station, a pair of rails for supporting each successive panel in such position adjacent the combining station, one of said rails being adapted to support the flange on said panel, a movable member supporting said one rail, panel releasing means for moving said movable member away from said panel to release said panel for tilting movement by gravity so as to bring the flange on said panel into the path of the core board at the combining station, each panel thereby being picked up by a corresponding core board as the core board is moved past the combining station by said conveyor, means for guiding each successive panel into fully combined relation with the corresponding core board as said core board is moved past the combining station, panel release control means for actuating said releasing means in response to the movement of each successive panel to its position adjacent the combining station, conveyor control means for actuating said conveyor in response to the tilting movement of each successive panel into the path of the core board at the combining station, and means for stopping said conveyor after a predetermined interval of advancing movement thereof to bring the next core board to the combining station.

4. A combination according to claim 3, in which said core board feeding means comprise a magazine for holding a supply of the boards, ejecting means for ejecting the successive boards from the magazine, forwarding means for forwarding the ejected boards from the magazine to said conveyor, and board feed control means comprising means for successively actuating said ejecting means and said forwarding means in response to the advancing movement of said conveyor.

5. In a machine for combining core members with cover panels of a type having a flange projecting laterally from one edge of each panel, the combination comprising a conveyor for carrying a series of the core members edgewise along a predetermined path to a combining station and then past the combining station, first and second spaced guide rails extending across said conveyor above the combining station, panel feeding means for moving the successive panels along said guide rails into a position over the combining station, the flange of each panel being supported by said first guide rail, a swingable releasing member supporting said first rail, panel releasing means for swinging said releasing member to move said first rail out from under the flange on said panel so that said flange is dropped by gravity into the path of the core member at the combining station, and control means for actuating said releasing means in response to movement of each successive panel to its position over said combining station, the panel being picked up and combined with the core member as the core member is moved past the combining station.

6. A combination according to claim 5, including ramp means sloping downwardly from said second rail for guiding the panel downwardly as it is picked up and combined with the underlying core member.

7. A combination according to claim 5, including a yieldable retarding device for engaging and holding back the flange of each successive panel as the panel is picked up and combined with the corresponding core member, said retarding device being yieldable to provide for movement of the panel and core member past said retarding device.

8. A combination according to claim 5, comprising a plurality of delivery wheels rotatable with the movement of said conveyor and projecting above said conveyor beyond the combining station, each of said delivery wheels having shoulder means for engaging and picking up the flanges on the successive panels to lift and remove the combined panels and core members from the conveyor.

9. A combination according to claim 5, comprising core member feeding means for feeding the successive core members across and upon said conveyor, and a glue applicator for applying glue to each of said core members as it is being fed to said conveyor by said core member feeding means.

10. A combination according to claim 9, in which said glue applicator comprises means operable by the movement of said core members for controlling the application of the glue to said core members.

11. A combination according to claim 5, comprising core member feeding means for longitudinally feeding the successive members across said conveyor, a cushioning device for stopping the longitudinal movement of the core members over said conveyor, said conveyor having pusher means for picking up the successive core members and moving them edgewise in a transverse direction, and a guide member extending from said cushioning device in a direction at an angle to the direction of movement of said conveyor for engaging and accurately positioning the core members in a longitudinal direction on said conveyor.

12. A combination according to claim 11, including means for adjusting the angular position of said guide member.

13. A combination according to claim 5, including stop means for arresting the sliding movement of the panels along said guide rails, and a swingable dog initially engaging one of said guide rails and spaced from said stop means by a distance corresponding generally to the length of each panel, said dog being biased toward the corresponding guide rail and being swingable away from said rail by each successive panel as it is moved along said guide rail to said stop means, said swingable dog thereupon being effective to return by its biasing action to said guide rail to arrest the rebounding movement of the panel from said stop means.

14. A machine for combining core members with cover panels of a type having a flange projecting laterally from one edge of each panel, comprising an intermittently movable conveyor for carrying a series of the core members along a predetermined path to a combining station and then past the combining station, core member feeding means for loading the successive core members upon said conveyor, panel feeding means for feeding the successive panels to a first position adjacent and generally parallel to the core member at the combining station, first sensing means for detecting each successive panel in said first position, panel shifting means operable in response to said first sensing means for moving each successive panel perpendicular to its length from said first position to a second position to bring its flange into the path of the core member at the combining station, second sensing means for detecting each successive panel in said second position, conveyor starting means for actuating said conveyor in response to said second sensing means, each panel thereby being picked up by a corresponding core member as the core member is moved past the combining station by said conveyor, and conveyor stopping means for stopping said conveyor after movement thereof to bring the next core member to the combining station.

15. A machine for combining core members with cover panels of a type having a flange projecting laterally from one edge of each panel, comprising an intermittently movable conveyor for carrying a series of the core members along a predetermined path to a combining station and then past the combining station, said conveyor comprising at least three parallel endless members having carriers thereon for supporting the core members, said carriers having transversely aligned pusher members for engaging the core members, each core member being supported by at least three carriers and being engaged by at least three pusher members, core member feeding means for loading the successive core members upon said carriers, panel feeding means for feeding the successive panels to a position adjacent and generally parallel to the core member at the combining station, panel shifting means for moving each successive panel to bring its flange into the path of the core member at the combining station, conveyor starting means for actuating said conveyor in response to such movement of each successive panel to bring its flange into the path of the corresponding core member, each panel thereby being picked up by a corresponding core member as the core member is moved past the combining station by said conveyor, and conveyor stopping means for stopping said conveyor after movement thereof to bring the next core member to the combining station.

References Cited

UNITED STATES PATENTS

| | | | |
|---|---|---|---|
| 3,010,864 | 11/1961 | Schneider et al. | 156—64 |
| 842,685 | 1/1907 | Mitchell | 292—341.17 X |
| 3,444,027 | 5/1969 | Smith et al. | 156—357 |
| 2,384,768 | 9/1945 | Rau | 156—364 |
| 3,034,199 | 5/1962 | Beckman et al. | 156—367 X |
| 3,366,253 | 1/1968 | Walchhuter | 214—6 |

JOHN T. GOOLKASIAN, Primary Examiner

R. A. KILLWORTH, Assistant Examiner

U.S. Cl. X.R.

29—211; 156—357, 363, 516, 578; 214—6

PO-1050
(5/69)

UNITED STATES PATENT OFFICE
CERTIFICATE OF CORRECTION

Patent No. 3,533,881          Dated  October 13, 1970

Inventor(s)  George Harold Beckman & John Robert

It is certified that error appears in the above-identified patent and that said Letters Patent are hereby corrected as shown below:

```
Col.  5, line 12, change "show" to "shown"
Col.  7, line 27, change "supply" to "apply"
Col.  9, line 2,  change "236" to "36"
Col. 14, line 22, change "insulated" to "uninsulated"
```

SIGNED AND
SEALED
JAN 12 1971

(SEAL)
Attest:

Edward M. Fletcher, Jr.
Attesting Officer

WILLIAM E. SCHUYLER, JR.
Commissioner of Patents